(12) United States Patent
Geffert et al.

(10) Patent No.: US 10,048,704 B2
(45) Date of Patent: Aug. 14, 2018

(54) THERMOSTATIC VALVE

(71) Applicant: Dr. Ing. h.c. F. Porsche Aktiengesellschaft, Stuttgart (DE)

(72) Inventors: Thomas Geffert, Freiberg am Neckar (DE); Frank Blum, Siegelsbach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 350 days.

(21) Appl. No.: 14/519,241

(22) Filed: Oct. 21, 2014

(65) Prior Publication Data

US 2015/0108231 A1     Apr. 23, 2015

(30) Foreign Application Priority Data

Oct. 22, 2013   (DE) .......................... 10 2013 111 618

(51) Int. Cl.
*G05D 23/02*     (2006.01)

(52) U.S. Cl.
CPC ......... *G05D 23/022* (2013.01); *G05D 23/024* (2013.01); *G05D 23/026* (2013.01)

(58) Field of Classification Search
CPC .... G05D 23/02; G05D 23/021; G05D 23/022; G05D 23/024; G05D 23/026
See application file for complete search history.

(56) References Cited

U.S. PATENT DOCUMENTS

| | | | |
|---|---|---|---|
| 2,881,616 A | 4/1959 | Clifford et al. | |
| 3,334,812 A | 8/1967 | Bailey | |
| 3,858,800 A | 1/1975 | Wong | |
| 4,537,158 A | 8/1985 | Saur | |
| 5,361,980 A | 11/1994 | Stout | |
| 6,772,958 B1* | 8/2004 | Lamb | ........................ F01P 7/16 236/100 |

(Continued)

FOREIGN PATENT DOCUMENTS

| CN | 102906477 A | 1/2013 |
|---|---|---|
| DE | 1917925 | 11/1970 |

(Continued)

OTHER PUBLICATIONS

German Search Report dated Feb. 26, 2014 for Application No. 10 2013 111 618.3, with partial translation.

(Continued)

*Primary Examiner* — Keith Raymond
*Assistant Examiner* — Nael Babaa
(74) *Attorney, Agent, or Firm* — RatnerPrestia

(57) ABSTRACT

A thermostatic valve with a valve housing having a fluid inlet and a fluid outlet, with an actuator which is accommodated in the valve housing and has a housing, and with a switching element which is operatively connected to the actuator in order to control a fluid connection between fluid inlet and fluid outlet, wherein a plunger protrudes out of the housing, the plunger being connected in an axially fixed manner to the valve housing, and the housing being accommodated in an axially shiftable manner in the valve housing, wherein the housing is mounted in the region of its opposite end regions in the valve housing by plain bearings, wherein the switching element is arranged in an axially displaceable manner relative to the housing of the actuator.

10 Claims, 2 Drawing Sheets

(56) References Cited

U.S. PATENT DOCUMENTS

| | | | |
|---|---|---|---|
| 6,948,707 B2* | 9/2005 | Gradu | B60G 21/0556 267/188 |
| 2005/0181647 A1* | 8/2005 | Dehnen | G05D 23/022 439/134 |
| 2007/0194141 A1* | 8/2007 | Brown | E03C 1/0408 236/93 A |
| 2013/0112763 A1 | 5/2013 | Roman | |

FOREIGN PATENT DOCUMENTS

| | | |
|---|---|---|
| DE | 96766 | 4/1973 |
| DE | 3320338 | 12/1984 |
| DE | 102010026368 | 1/2012 |
| FR | 1506854 A | 12/1967 |
| FR | 2226601 A1 | 11/1974 |
| GB | 1273687 | 5/1972 |

OTHER PUBLICATIONS

French Search Report and Written Opinion for International Application No. 1460076, dated Mar. 31, 2017, 5 pages.

Chinese Office Action with Search Report for Chinese Application No. 201410561861.7, dated Apr. 5, 2017—4 Pages.

English translation of Chinese Office Action in corresponding application No. 2014-10561861.7, dated Oct. 25, 2017, 4 pages.

* cited by examiner ly shifted relative to the piston or to the piston rod/plunger and, in the process, slides in turn at its end opposite the support of the piston rod/plunger in an opening of the housing of the thermostat counter to the restoring force of a spring. A plate is connected to the housing of the actuator as the switching element, said plate rising from an abutment when the expansion material expands and opening up a passage opening between fluid inlet and fluid outlet.

THERMOSTATIC VALVE

CROSS-REFERENCE TO RELATED APPLICATIONS

This application claims priority under 35 U.S.C. § 119 of German Patent Application No. 10 2013 111 618.3, filed Oct. 22, 2013, which is incorporated by reference herein in its entirety.

FIELD OF THE INVENTION

The invention relates to a thermostatic valve with an actuator for actuating a switching element.

BACKGROUND OF THE INVENTION

Various thermostatic valves, in particular for the coolant circuit of a motor vehicle, have been disclosed in the prior art. DD 96 766, which is incorporated by reference herein, and DE 1917 925, which is incorporated by reference herein, each disclose a thermostatic valve with an actuator having an expansion material filling, in which an actuating piston is accommodated in a housing filled with the expansion material and protrudes out of the housing with a piston rod or a plunger, wherein the end side of the piston rod or plunger is mounted in the housing of the thermostat. When the expansion material expands, the housing of the actuator is shifted relative to the piston or to the piston rod/plunger and, in the process, slides in turn at its end opposite the support of the piston rod/plunger in an opening of the housing of the thermostat counter to the restoring force of a spring. A plate is connected to the housing of the actuator as the switching element, said plate rising from an abutment when the expansion material expands and opening up a passage opening between fluid inlet and fluid outlet.

The actuator here is fixedly clamped at its one distal end by means of the piston rod/plunger and, at its opposite distal end, is mounted in a sliding manner on the housing of the actuator.

This arrangement of the bearings may lead to tilting of the actuator, if the sealing connection and guidance of the piston rod into the housing of the actuator are not optimally formed, thus resulting in kinematics which are not reproducible.

SUMMARY OF THE INVENTION

Described herein is a thermostatic valve which has a stable design in comparison to the thermostatic valves from the prior art and is nevertheless constructed simply and cost-effectively and has improved kinematics.

An exemplary embodiment of the invention relates to a thermostatic valve with a valve housing having a fluid inlet and a fluid outlet, with an actuator which is accommodated in the valve housing and has a housing, and with a switching element which is operatively connected to the actuator in order to control a fluid connection between fluid inlet and fluid outlet, wherein a plunger protrudes out of the housing, said plunger being connected in an axially fixed manner to the valve housing, and the housing being accommodated in an axially shiftable manner in the valve housing, wherein the housing is mounted in the region of its opposite end regions in the valve housing by means of plain bearings, wherein the switching element is arranged in an axially displaceable manner relative to the housing of the actuator.

It is advantageous here if the switching element is arranged in an axially shiftable and non-rotatable manner in the valve housing.

It is also expedient in particular if the valve housing has an axial, in particular rectilinear, slotted guide, wherein the switching element has an engagement element which engages in the slotted guide.

It is also expedient in particular if the valve housing has an engagement element which engages in an axial, in particular rectilinear, slotted guide of the switching element.

It is particularly advantageous if the housing is acted upon in the axial direction by a force accumulator, wherein the force accumulator is arranged supported between the valve housing and the housing or the switching element.

It is particularly advantageous if the switching element is a cylindrical or cup-like element which has, on its outer circumference and/or on at least one end surface, an opening for the passage of a fluid.

It is also advantageous if the switching element is substantially in the form of a disk which has, on its outer circumference and/or on at least one end surface, an opening for the passage of a fluid.

It is also advantageous in the invention if the housing has a cylinder space, with a piston which is accommodated in the cylinder space, wherein the piston is provided with a piston rod which protrudes out of the housing, wherein the cylinder space is filled with a medium.

It is particularly advantageous if the medium is an expansion material.

Alternatively, it is expedient if the medium is a magnetorheological fluid.

BRIEF DESCRIPTION OF THE DRAWING FIGURES

The invention is explained in detail below using an exemplary embodiment with reference to the drawing. In the drawing.

DETAILED DESCRIPTION OF THE INVENTION

Figure 1:
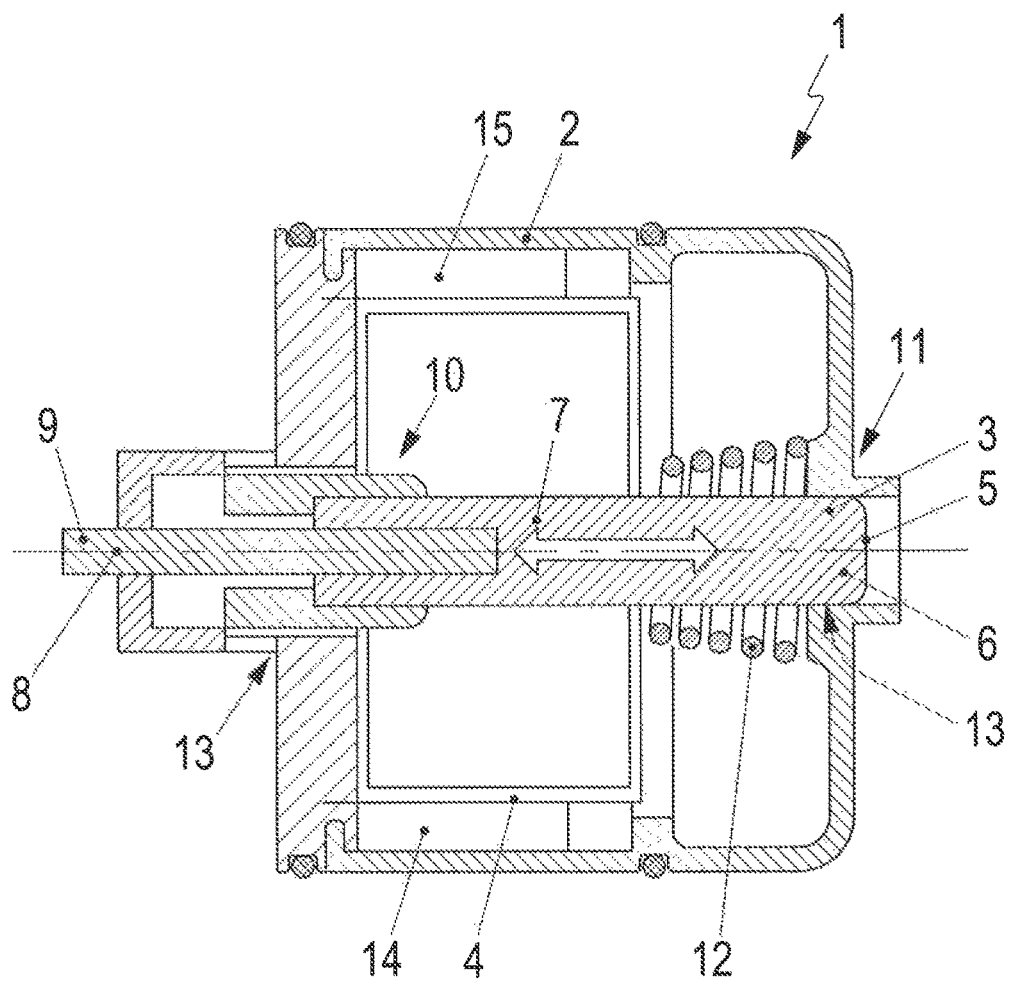
FIG. 1 shows a schematic view of a thermostatic valve in section.

FIG. 1 shows an exemplary embodiment of a valve 1 with a valve housing 2 and an actuator 3 arranged therein. The actuator 3 has a housing 5 with a cylinder space 6 which is defined therein and has a medium filling 7. A piston rod or a plunger 8 protrudes into the housing 5 of the actuator.

The actuator is fixed in the valve housing 2 via the plunger 8 or the piston rod in such a manner that the distal end 9 of the plunger 8 is fixed in the valve housing while the housing 5 of the actuator 3 is mounted in a sliding manner in the valve housing 2. For this purpose, the housing 5 is accommodated slidably at its distal end regions 10, 11 in a receptacle in the valve housing. The housing 5 is mounted slidably within the valve housing 2 by plain bearings 13.

The valve 1 has a switching element 4 which is of cylinder-like or cup-like design and which is connected to the housing 5 of the actuator.

The housing 5 of the actuator 3 is arranged shiftably in the axial direction, wherein the housing 5 or the switching element 4 connected to the housing 5 is supported in the axial direction against the force accumulator 12 such that the switching element 4 is shifted by means of the housing 5 of the actuator 3 counter to the restoring force of the force accumulator 12.

When the actuator 3 is acted upon, the housing 5 of the actuator 3 is shifted axially, which results in an axial shifting of the switching element 4 of the thermostatic valve 1 in order to be able to control inlet and/or outlet openings 14, 15 of the thermostatic valve 1 on the basis of the shifting of the switching element 4.

The medium in the housing is preferably an expansion material which thermally expands when there is an increase in temperature and therefore pushes the piston rod of a piston or the plunger 8 out of the housing and thus, when the plunger 8 is fixed, shifts the housing 5 axially.

Figure 2:
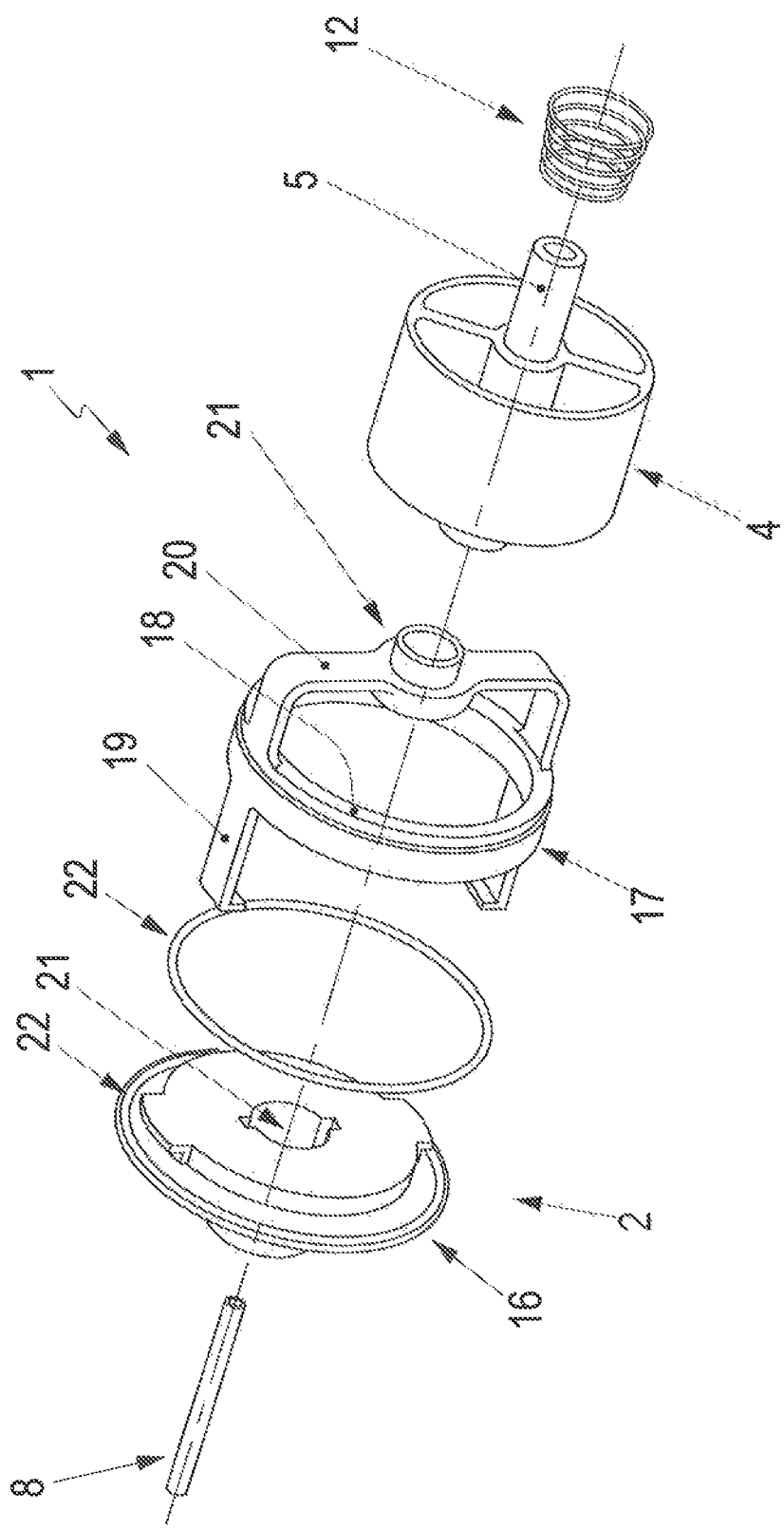
FIG. 2 shows a perspective view of a thermostatic valve with an axially shiftable switching element.

FIG. 2 shows the thermostatic valve 1 according to aspects of the invention in an exploded illustration. The valve housing 2 is formed by a cover 16 and a cage 17 which are connected to each other.

For this purpose, the cage 17 has an annular body 18 with connecting struts 19, 20. An opening 21 for receiving the housing 5 of the actuator 3 is provided both in the cover 16 and in the strut 20. A sealing ring 22 is arranged radially on the outside of the cover 16 and of the annular body 18 in order to seal off the thermostatic valve 1 from a surrounding environment.

The openings 21 serve as plain bearings of the housing 5 of the actuator, and therefore the housing 5 is accommodated in an axially shiftable manner in the openings.

The plunger 8 also serves as a heating pin for controlling the temperature of the expansion material in the housing 5.

The force accumulator 12 is provided on the end side of the housing 5 or of the switching element 4 connected to the housing 5, and therefore either the housing 5 or the switching element 4, which is connected in an axially fixed manner to the housing, is supported on the force accumulator 12.

The switching element 4 is preferably formed integrally with the housing 5 or is connected thereto in a form-fitting manner. So that the switching element does not rotate in the valve housing, the switching element 4 can be guided axially by means of a slotted guide provided in the housing, wherein the switching element then has an engagement element which engages in the slotted guide. Alternatively, the switching element can also be guided axially by means of an engagement element provided in the housing and a slotted guide provided on the switching element, wherein the switching element then has the slotted guide in which an engagement element of the valve housing engages.

When the housing 5 of the actuator 3 is shifted axially, the switching element 4 is likewise shifted axially. Fluid flows can therefore be controlled by the switching element 4 opening or closing inlet and/or outlet openings in the housing of the valve in order to be able to activate a targeted flow through the valve.

LIST OF REFERENCE NUMBERS

1 Valve
2 Valve housing
3 Actuator
4 Switching element
5 Housing
6 Cylinder space
7 Medium filling
8 Plunger
9 End
10 End region
11 End region
12 Force accumulator
13 Plain bearing
14 Inlet and/or outlet opening
15 Inlet and/or outlet opening
16 Cover
17 Cage
18 Annular body
19 Connecting strut
20 Connecting strut
21 Opening
22 Sealing ring

What is claimed is:

1. A thermostatic valve comprising:
a valve housing having a fluid inlet and a fluid outlet,
an actuator which is accommodated in the valve housing and has an actuator housing, and
a switching element which is operatively connected to the actuator housing in order to control a fluid connection between the fluid inlet and the fluid outlet, wherein the actuator housing is positioned through the switching element,
wherein a plunger protrudes out of the actuator housing, said plunger being connected in an axially fixed manner to the valve housing, and the actuator housing being accommodated in an axially shiftable manner in the valve housing,
wherein the actuator housing includes opposed ends, one end of the opposed ends of the actuator housing is mounted in an axially shiftable manner to a bearing surface in the valve housing surrounding said one end of the actuator housing, another end of the opposed ends of the actuator housing is mounted in an axially shiftable manner to another bearing surface in the valve housing surrounding said another end of the actuator housing, each bearing surface being disposed in an axially fixed manner with respect to the valve housing,
wherein the switching element is arranged in an axially displaceable manner relative to the valve housing.

2. The thermostatic valve as claimed in claim 1, wherein the switching element is arranged in an axially shiftable and non-rotatable manner in the valve housing.

3. The thermostatic valve as claimed in claim 1, wherein the valve housing has an axial slotted guide, wherein the switching element has an engagement element which engages in the slotted guide.

4. The thermostatic valve as claimed in claim 1, wherein the valve housing has an engagement element which engages in an axial slotted guide of the switching element.

5. The thermostatic valve as claimed in claim 1, wherein the valve housing is acted upon in the axial direction by a force accumulator, wherein the force accumulator is arranged in a supported manner in the valve housing and the actuator housing or the switching element.

6. The thermostatic valve as claimed in claim 1, wherein the switching element is a cylindrical element which has an opening for the passage of a fluid, the opening being located either on an outer circumference or on at least one end surface of the switching element.

7. The thermostatic valve as claimed in claim 1, wherein the switching element is in the form of a disk which has an opening for the passage of a fluid, the opening being located either on an outer circumference or on at least one end surface of the disk.

8. The thermostatic valve as claimed in claim 1, wherein the actuator housing has a cylinder space, with the plunger being accommodated in the cylinder space, wherein the plunger protrudes out of the actuator housing, wherein the cylinder space is filled with a medium.

9. The thermostatic valve as claimed in claim 8, wherein the medium is an expansion material.

10. The thermostatic valve as claimed in claim 8, wherein the medium is a magneto-rheological fluid.

\* \* \* \* \*